July 31, 1956     A. F. BOROWSKI     2,756,818
SEQUENCE CONTROLLER
Filed March 6, 1952     2 Sheets-Sheet 1
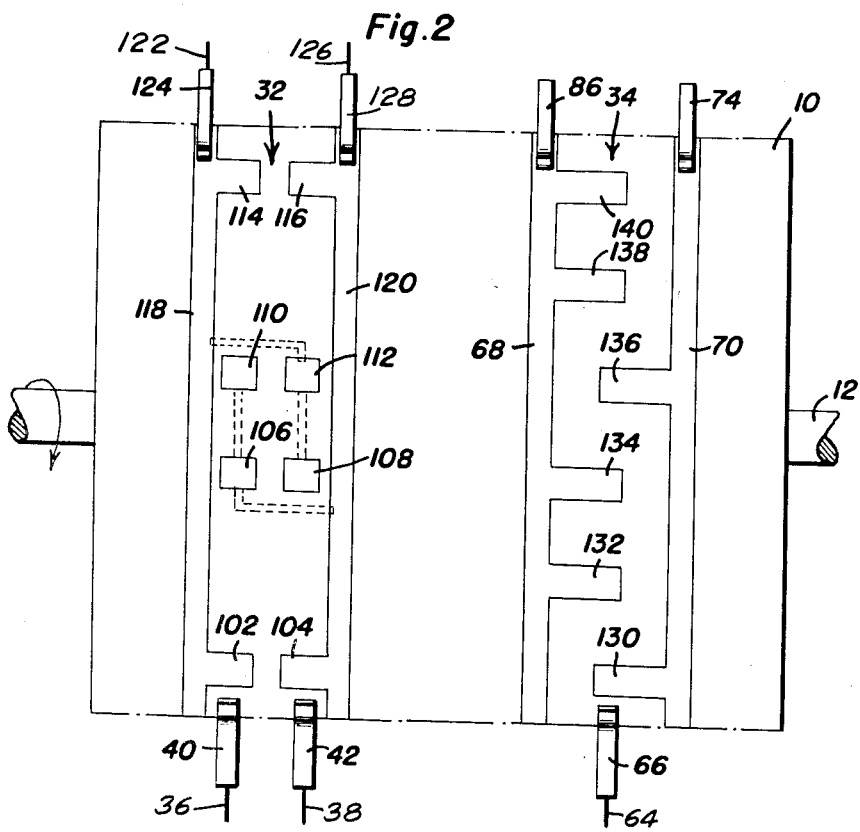
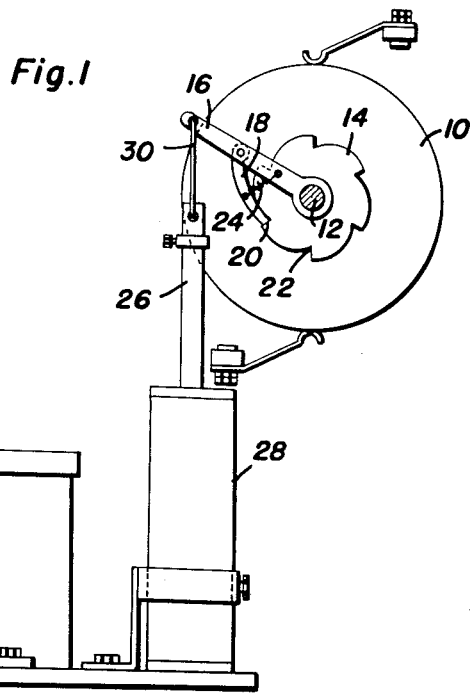
Anthony F. Borowski
INVENTOR.

July 31, 1956

A. F. BOROWSKI 2,756,818

SEQUENCE CONTROLLER

Filed March 6, 1952

Anthony F. Borowski
INVENTOR.

BY *Clarence A. O'Brien*
*and Harvey B. Jackson*
Attorneys

United States Patent Office 2,756,818
Patented July 31, 1956

2,756,818

SEQUENCE CONTROLLER

Anthony F. Borowski, Chicago, Ill.

Application March 6, 1952, Serial No. 275,098

1 Claim. (Cl. 161—1)

This invention relates to a cyclic control circuit and particularly to a drum controller which when started will go through a complete cycle of events and return to the starting point.

The operation of many machines such as milling cutters, boring machines and other machines require that the motors operating the devices should go through a sequence of events to perform a sequence of operations and then return to the starting point.

The present invention relates to a drum controller having contacts for controlling the series of events and auxiliary contacts for operating the drum so that the drum sequentially moves through the steps necessary to perform the cycle of operations.

The apparatus according to the invention comprises a drum controller with a solenoid operating device for advancing the drum controller a step at a time in a single direction and parallel control circuits one of which contains a control switch and the other of which contains a periodic timing element for supplying impulses to the solenoid operator. The drum also contains a plurality of auxiliary contacts so that either one of the parallel circuits may be connected as is desirable for the particular sequence of events.

It is accordingly an object of this invention to provide an improved cyclic control system.

It is a further object of this invention to provide a control system having automatic sequence steps.

It is another object of the invention to provide a drum controller driven by a solenoid and timing means for supplying impulses to the solenoid.

It is a further object of the invention to provide a control circuit having a spark suppressing circuit in shunt therewith.

It is a further object of this invention to provide a sequence operation which can be started manually and can continue through automatically to return to the initial step.

Other objects and many of the attendant advantages of this invention will be apparent from the following details and description taken in conjunction with the accompanying drawings, in which:

Figure 1 is an elevational view of the controller according to the invention;

Figure 2 is a developed surface of a control drum according to the invention;

Figure 3:
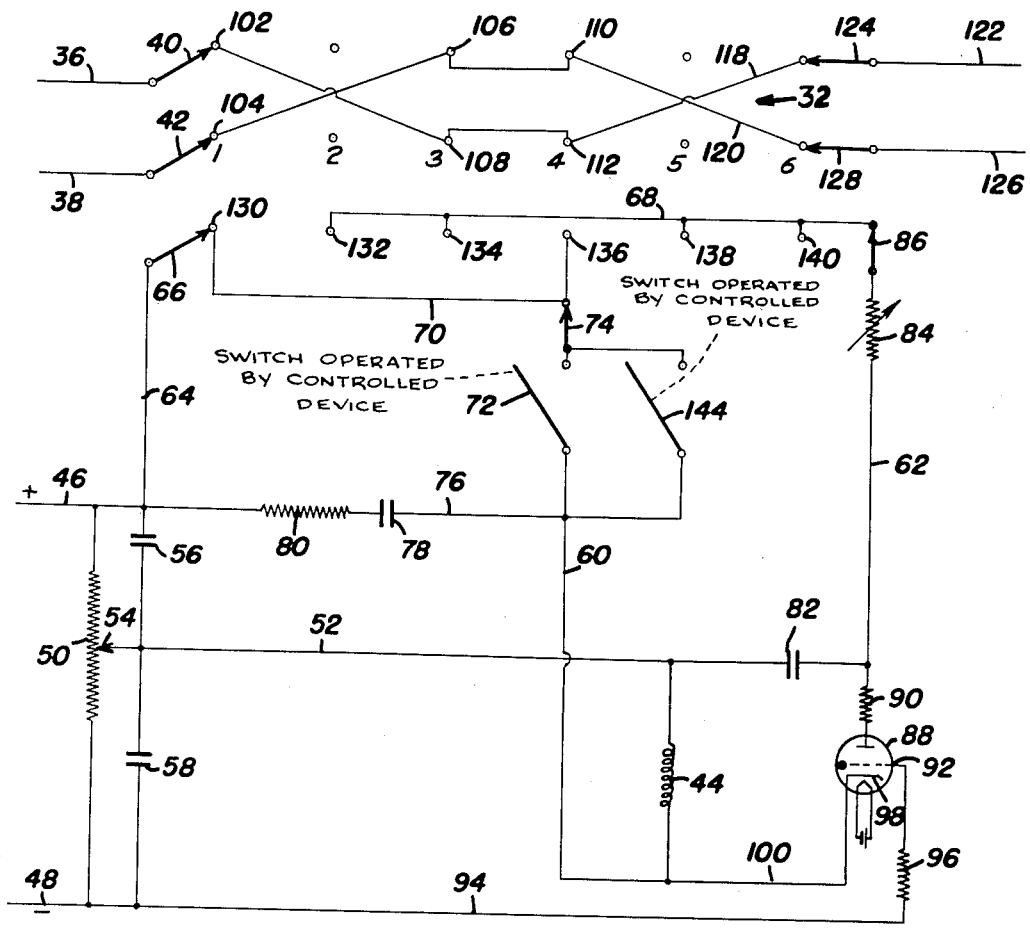
Figure 3 is a schematic wiring diagram according to the invention.

The exemplary embodiment according to the invention includes a control drum 10 mounted on an axle 12 which will be journaled in any suitable bearings (not shown). The ratchet wheel 14 is affixed on the shaft 12 and an actuating lever 16 is journaled on the shaft 12 adjacent to the ratchet wheel 14. A pawl 18 is pivoted on the lever 16 and its end 20 is biased into contact with the surface 22 of the ratchet wheel 14 by means of a suitable spring 24. The lever 16 is connected to a plunger 26 of a solenoid 28 by means of a link 30.

The surface of the drum 10 is provided with control contacts 32 and auxiliary actuating contacts 34. A supply line having conductors 36, 38 is connected to brush members 40 and 42 which contact the surface of the drum in the rotating path of the contact elements 32. The solenoid 28 has an actuating coil 44 and is energized from a suitable source of direct current (not shown), having a positive terminal 46 and a negative conductor 48. The voltage divider 50 is connected between the conductors 46 and 48, a conductor 52 has a terminal 54 adjustably associated with the voltage divider 50 so that a suitable potential may be developed between the point 54 and the conductor 46 to apply to the coil 44 for actuating the plunger 26. The stabilizing capacitors 56 and 58 are connected between the points 54 and 46, and 54 and 48, respectively. These capacitors are of considerable capacitance value and serve to maintain the voltage steady between the point 54 and the conductors 46 and 48, regardless of momentary drains on the system.

A pair of parallel circuits 60 and 62 are provided for energizing the coil 44. The energizing circuit 60 is provided with control switches normally operative to open or close the circuit, to start or stop operations thereof. The energizing circuit 62, on the other hand, is provided with a periodic timing device so that the sequence of events may be automatically controlled.

The actuating contacts 34 of the drum 10 are utilized to selectively connect the energizing circuits 60 or 62 to the terminal 46. This is accomplished by means of a conductor 64 connected to conductor 46 and connecting to a brush 66 which contacts the surface of the drum 10 in the path of the auxiliary contacts 34. The energizing circuit 60 includes a control switch 72 and is connected to the collector ring 70 by means of a brush 74. The spark suppressor circuit 76 is connected in shunt across the two circuit breaks, that is, brush 66 and contacts 30 as well as switch 72 so that brush 66 as well as switch 72 may operate on or out of contact without unnecessary sparking. The spark suppressor circuit in general includes a capacitor 78 and a series impedance 80.

The other parallel energizing circuit 62 includes timing elements including a capacitor 82 connected to the voltage point 54 and the impedance element 84 connected in series circuit relation with the capacitor 82. Preferably the impedance 84 is made variable so that the charging time of the capacitor 82 may be varied as desired. The circuit 62 is connected to the collector ring 68 by means of a brush 86. The capacitor 82 is connected in series circuit relation with the coil 44 by means of an electric valve 88 therein indicated as of the gas filled triode type, however, it will be apparent that any suitable electric valve can be utilized. The current limiting impedance 90 is connected in series circuit relation with the capacitor and the valve 88 to limit the instantaneous current to the value that can be carried safely by the valve 88. Control grid 92 is supplied with a negative bias from the negative terminal 48 and is proportioned by the amount of voltage appearing between the connection 54 and the terminal 48. Grid 92 is connected to the terminal 48 by means of a conductor 94 which contains the current limiting resistance 96 to control the current flow to the grid 92. The cathode 98 of the valve 88 is connected to the coil 44 by means of the conductor 100.

Obviously, the drum device may be utilized to make any desired number of steps in any desired relation. For purposes of illustration, the drum is provided with a contact track 32 having 6 contact stations therein. Obviously any desired number of steps or stations could be supplied and connected in any desired relation. For purposes of exemplification the contact track 32 is shown as having 6 stations, numbered 1 to 6. Contacts 102 and 104 are provided at station 1 while no contacts are provided at station 2, contacts 106 and 108 are provided at station 3 while contacts 110 and 112 are provided at station 4, no contacts are provided at station 5 while contacts 114 and 116 are provided at station 6. A pair of collector rings 118 and 120 are selectively connected to the contact in the two contact tracks of the controller. In the exemplification herein shown, contact 102 is connected to collector ring 118 while contact 104 is connected to collector ring 120. Collector ring 118 being connected to the load line 122 by brush 124 and load line 126 is connected to collector 120 by means of brush 128. At station 3 contact 106 is connected to collector ring 120 and contact 108 is connected to collector ring 118. Likewise, at station 4 contact 110 is connected to collector ring 120 and contact 112 is connected to collector ring 118 and at station 6, contact 114 is connected to collector ring 118 and contact 116 is connected to collector ring 120. This arrangement of contacts permit alternate electrical connections to the collector rings 118 and 120; the supply line may be either the two lines of a direct current supply to be connected to the armature of a direct current motor or they may be two phases of a three phase line to be connected to a three phase alternating current motor. Assuming the supply line to be energized, when the brushes contact contacts 102 and 104 at station 1, the load line will be energized in a predetermined direction. When the drum 10 advances to the station #2 the brushes 40 and 42 will be on the blank terminals of the drum and the load line will be disconnected thereby shutting down whatever device is connected to the line. When the drum advances to station #3, the supply line will be connected to the contacts 106 and 108 in the reverse order so that the load such as the motor will be reversed. Advancing the drum to station #4 reverses the supply line connected to the load line in exactly the same relation as in station #3 but advancing to station #5 again advances to a nulled point and cuts off the power to the load line. Again advancing to station #6 connects line 36 to the line 122 and the line 38 to the line 126 or at the polarity or direction of rotation of an alternating current motor would be identical as seen in station #1. Obviously, any other arrangement of stops and starts or reverses could be made or any number of stations could be utilized.

The auxiliary actuating control path 34 contains a first station contact 130 which is connected to collector ring 70 while stations 2 and 3 contain contactors 132 and 134 connected to collector ring 68. Station 4 again contains contactor 136 connected to 70 while stations 5 and 6 have contactors 138 and 140 each connected to collector ring 68. When the drum is in the position of station 1 the collector ring 70 will be connected to the positive terminal 46 by means of brush 66 and the conductor 64, and current flow in conductor 64 will be controlled by means of the switch 72. In order to control the line 60 from a plurality of points, auxiliary switches 144 may be mounted in shunt with switch 72 and these switches may be mounted in any desired point about the machine or preferably may be limit switches of the machine being operated. To initiate operation of the device, the switch 72 or one of the parallel switches 144 will be momentarily closed energizing the coil 44 over the conductors 60 and conductor 52 back to the contact point 54. Energization of the coil 44 actuates the plunger 26 which will move the drum 10 to station 2 and will connect brush 66 to contact 132 which is in contact with circuit 62 through brush 86, current then will flow through conductor 64, brush 66, collector ring 68, brush 86, impedance 84, conductor 62 to capacitor 82 which is connected to the voltage point 54 by means of the conductor 52. The capacitor 82 will reach its capacity at a predetermined time which is regulated by means of the impedance 84. Obviously, the impedance 84 may be varied to control the charging time of the capacitor 82 to allow any desired operating period on the controller 10. After a predetermined interval the capacitor 82 will be charged sufficiently to cause discharge through the thermionic valve 88 and the coil 44. This discharge will be at a rate determined by the impedance 90 and the impedance of the coil 44. Obviously the impulse delivered through the valve 88 will cause the drum 10 to move to station 3 and the charging and discharging sequence will be repeated. This will cause the drum to move to station 4 where the contact 136 is connected to the slip ring 70 and if the switch 72 or 144 is closed immediately energizes coil 44 and advances the drum to station 5. At station 5 the automatic sequence again takes place; preferably at the arrival of station 6, the switches 72 and 144 will open either by manual control or by some automatic control or in response to some action of the load circuit. The timing circuit will automatically return the drum to station 1 and because of the opening of switches 72 and 144 there will be no further action of the sequence controller.

Figure 4:
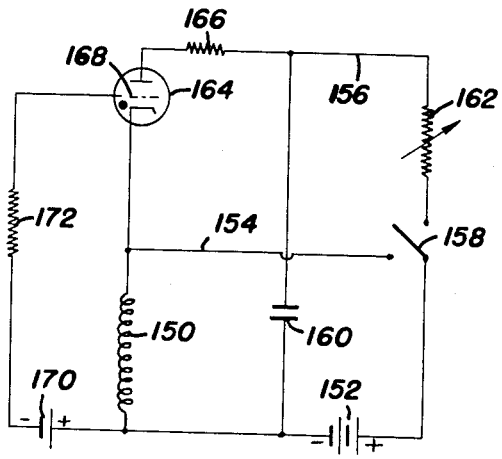
Figure 4 is a simplified wiring diagram illustrating the operation according to the invention.

The action of the automatic time controller is exemplified in the simplified drawing of the Figure 4 where the coil 150 is supplied with energy from a source 152. The source 152 is connectable to the coil 150 by either of two parallel circuits 154 or 156. A selector switch 158 serves the purpose of the selector track 34 on the drum 10. When the selector switch 158 is connected to circuit 154 coil 150 will be directly connected across the source 152. However, when the selector switch 158 is connected to the circuit 156 the capacitor 160 will be charged through the impedance 162. When the capacitor 160 has reached a sufficient charge it will be discharged through the electric valve 164 and the current through the coil 150 will be limited by the impedance 166. The control of the operation of the thermionic valve 164 is exercised by means of grid 168 which receives a bias potential from the battery 170, the impedance 172 being provided between battery 170 and grid 168 to limit the current to the grid 168.

In the operation of the simplified circuit the switch 158 may be utilized to actuate the coil at any desired time. It may then be switched to circuit 156 and as long as it is maintained in contact therewith the coil 150 will be periodically energized because of the timing circuit arrangement in 156.

A typical control cycle of the illustrated embodiment is as follows: Switches 72 and 144 are normally open and are momentarily closed to begin the control cycle. The control cycle as illustrated in Figure 3 begins at step 1 and ends at step 4. The succeeding control cycle, which is begun by closing switch 72 or 144, is from step 4 to step 1. Thus in the illustration there are two complete control cycles to each single full load cycle.

In the illustration this method of having two control cycles per each supply cycle was chosen for an application similar to the following. Assume a mechanical movement of forward and reverse which is to be restricted in the extent of its travel. Then switches 72 and 144 are limit switches to control the extremes of the motion. In step 1 power is supplied to produce the desired motion. When the extreme of the motion is reached switch 72 is closed momentarily. This advances the drum 10 to step 2 and shuts off the power. After the proper delay interval the timing circuit advances the drum 10 to step 3 and produces the reverse motion but the switches are still inactive since quite often in a mechanical movement there is some overtravel. Hence the time from step 3 to step 4 is provided so that there is no possibility of switch 72 being energized at an undesired time. Step 4 then allows the reverse motion to continue until the other limit switch 144 is closed which steps drum 10 to step 5. Steps 5 and 6 of the control circuit are similar to steps 2 and 3.

If it is desired to have one control cycle for each supply cycle it can be accomplished by connecting contact 136 to collector ring 68 in place of conductor 70.

Hence by the proper connections of the collector rings of the control circuit, either a fractional, integral or multiple number of control cycles can be had in one supply cycle.

It will thus be seen that there is herein provided a completely automatic time control system for advancing a drum controller is gradatim relation over any predetermined number of sequences. Obviously, any desired number of steps in any sequence can be selected and set up on the drum system.

For purposes of exemplification a particular embodiment of the invention has been shown and described according to the best present understanding thereof, however, it will be apparent to those skilled in the art that many changes and modifications can be made therein without departing from the true spirit of the invention.

Having described the invention, what is claimed as new is:

A device for cyclically controlling a plurality of operating circuits in a controlled device comprising a rotating member, a first pair of collector rings and a second pair of collector rings on said rotating member, said collector rings of each of said pairs of collector rings each having a plurality of contacts electrically connected thereto and spaced along the periphery of said rotating member, a first plurality of stationary contact members sliding over and successively engaging said contacts and a second plurality of stationary contact members sliding over and continuously engaging said collector rings, the stationary contact members engaging said first pair of collector rings and the contacts of said first pair of collector rings being connected with the operating circuits of a controlled device and with a source of electrical power to selectively close, shift and interrupt connections between said source of electrical power and said operating circuits, the stationary contact members engaging said second pair of collector rings and the contacts of said second pair of collector rings being connected to a capacity controlled actuating circuit of an electromagnetic stepping device and a supply of electrical power for connecting said electromagnetic stepping device to said supply of electrical power operated by said controlled device, said first plurality of stationary contact members being arranged in peripherally spaced relationship with said second plurality of stationary contact members so that step-by-step rotation of said rotating member depends selectively upon closure of said supply of electrical power operated by said controlled device to actuate said electromagnetic stepping device or after a predetermined capacity-controlled interval when said capacity-controlled actuating circuit actuates said electromagnetic stepping device.

References Cited in the file of this patent

UNITED STATES PATENTS

| Number | Name | Date |
|---|---|---|
| 281,799 | Sheehy | July 24, 1883 |
| 443,606 | Johnson | Dec. 30, 1890 |
| 798,915 | Miller | Sept. 5, 1905 |
| 886,141 | Luschka | Apr. 28, 1908 |
| 990,790 | Formin | Apr. 25, 1911 |
| 1,317,109 | Sohm | Sept. 23, 1919 |
| 1,514,751 | Wold | Nov. 11, 1924 |
| 1,836,797 | Harter | Dec. 15, 1931 |
| 1,907,279 | Blomberg | May 2, 1933 |
| 1,914,215 | Price | June 13, 1933 |
| 2,024,019 | Wright | Dec. 10, 1935 |
| 2,137,507 | Ostline | Nov. 22, 1938 |
| 2,338,305 | Simmon | Jan. 4, 1944 |